UNITED STATES PATENT OFFICE.

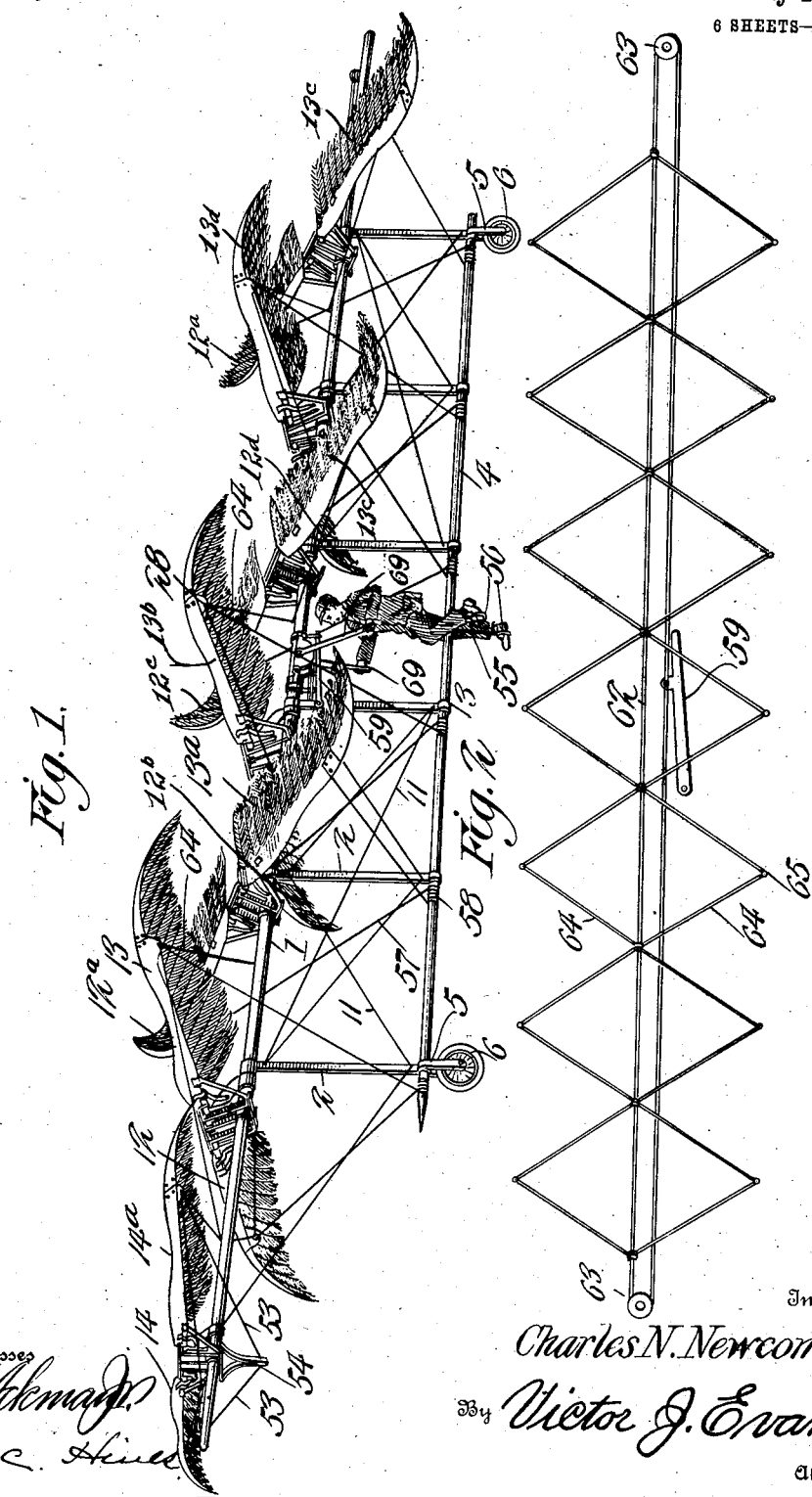

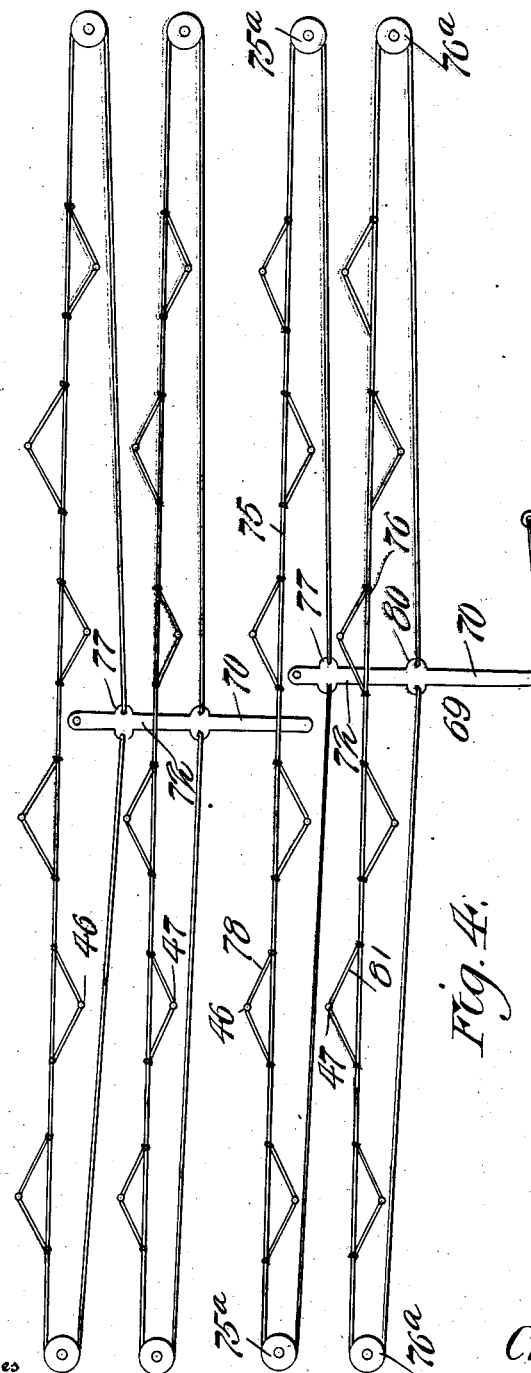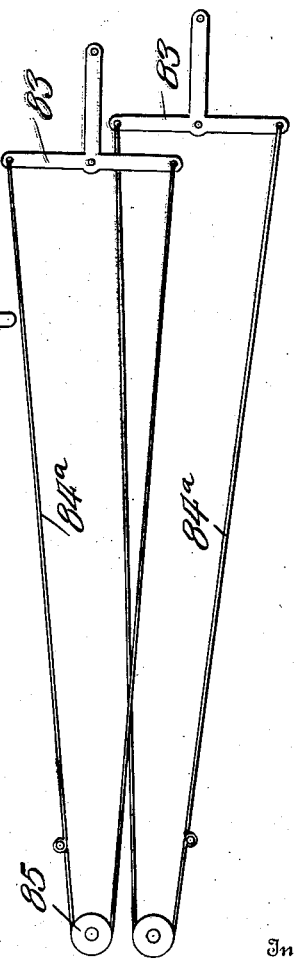

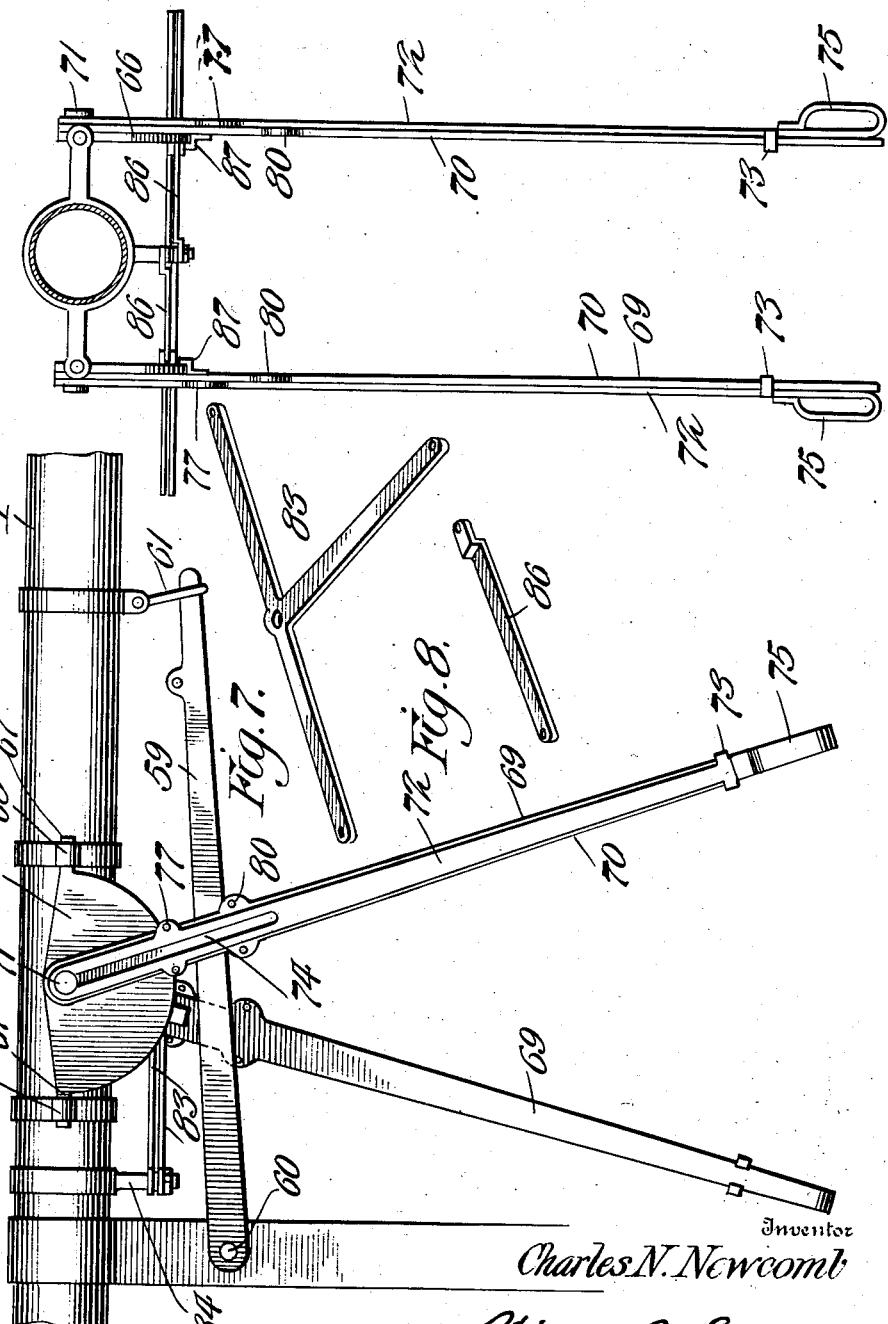

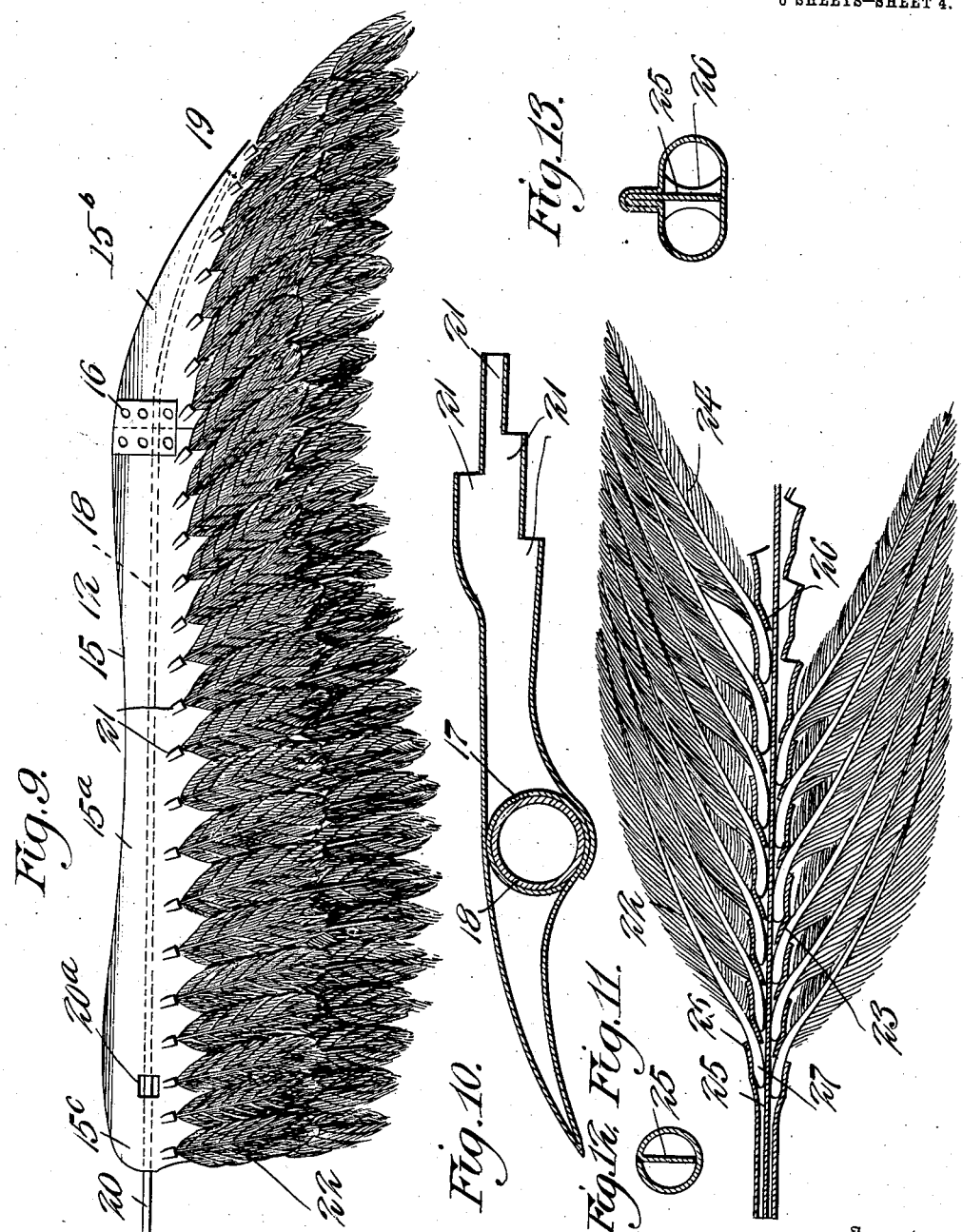

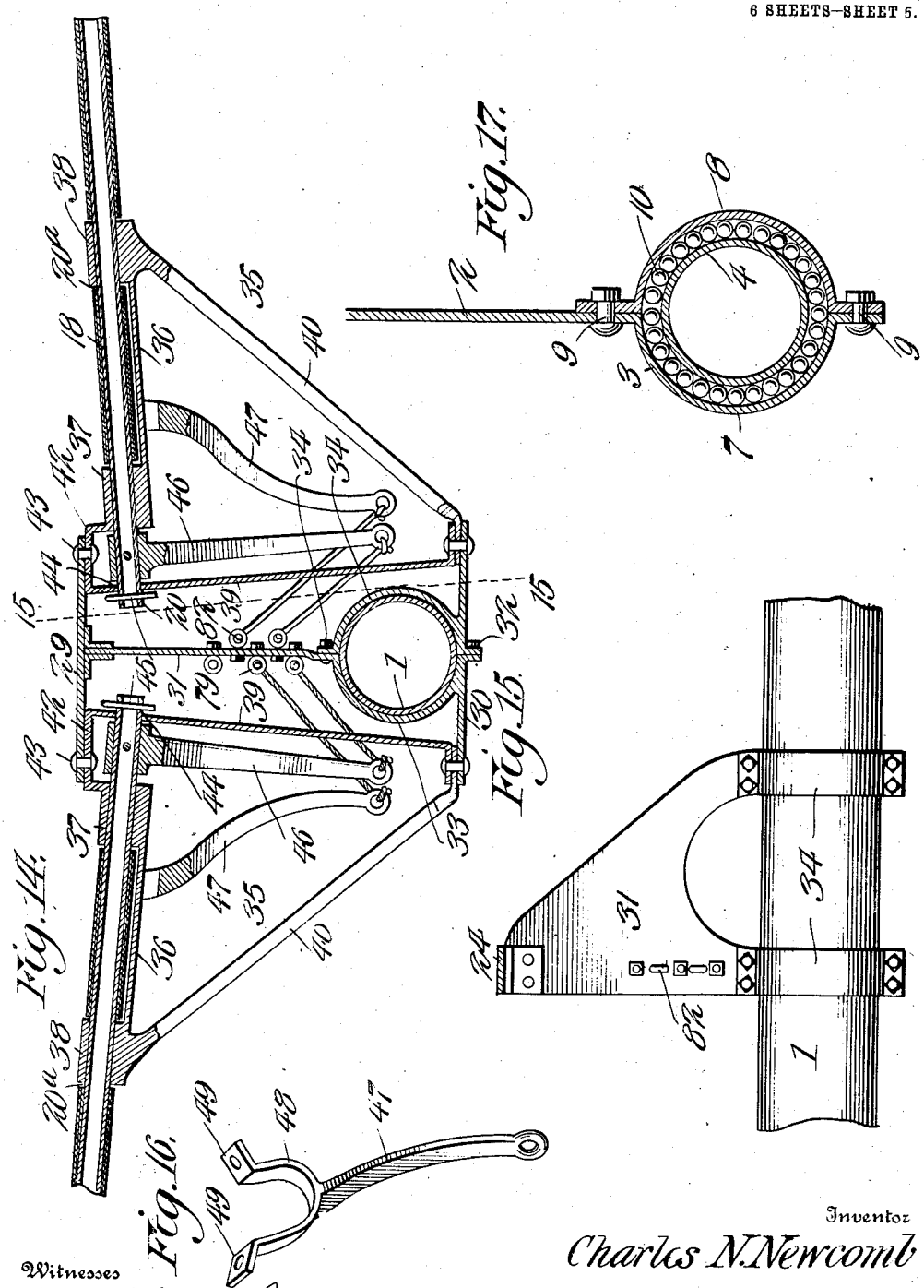

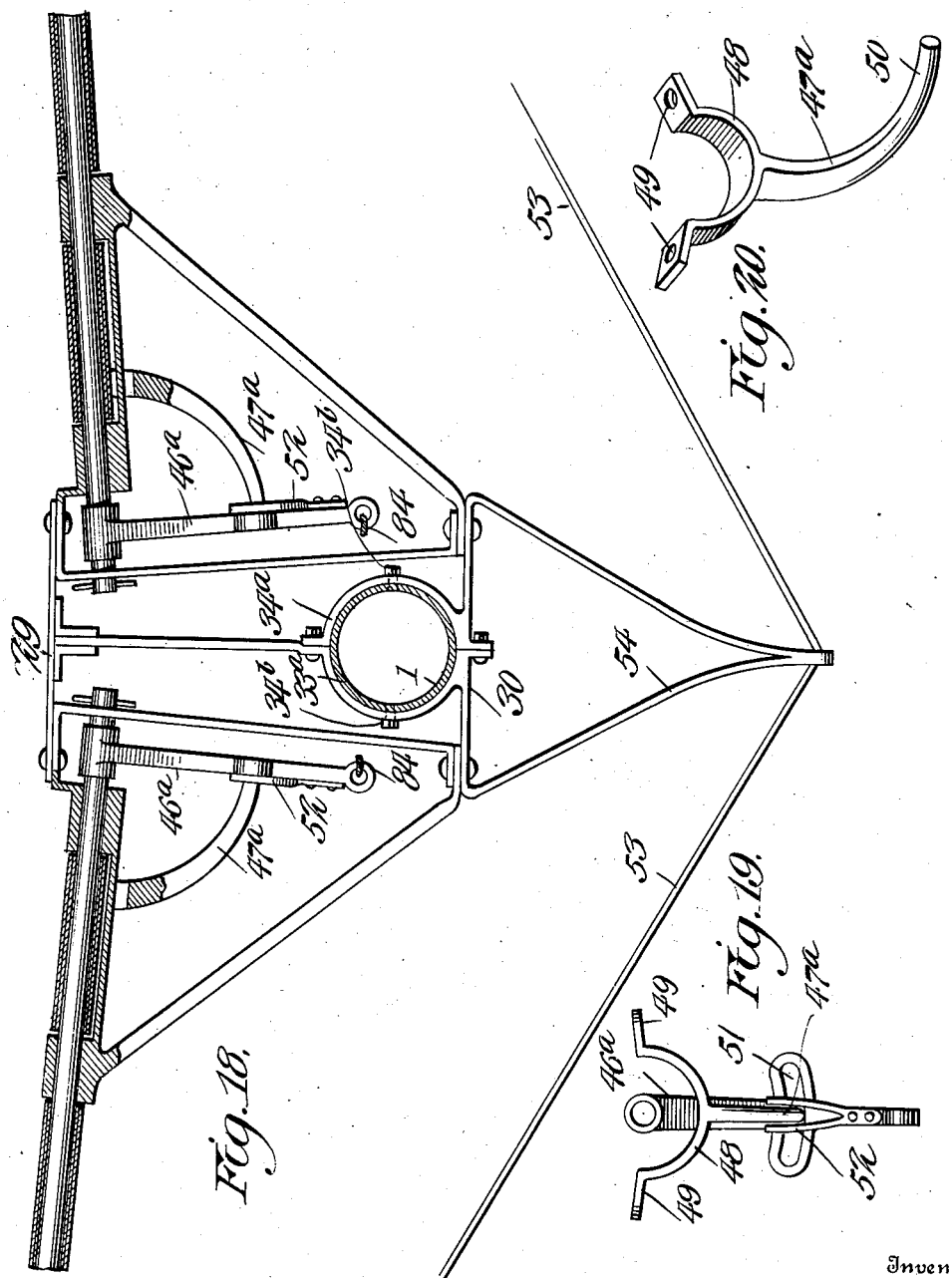

CHARLES N. NEWCOMB, OF WEST PALMBEACH, FLORIDA.

FLYING-MACHINE.

992,579.

Specification of Letters Patent. Patented May 16, 1911.

Application filed August 5, 1908. Serial No. 447,132.

*To all whom it may concern:*

Be it known that I, CHARLES N. NEWCOMB, a citizen of the United States, residing at West Palmbeach, in the county of Palm Beach and State of Florida, have invented new and useful Improvements in Flying-Machines, of which the following is a specification.

This invention relates to flying machines of the heavier-than-air type, and particularly to machines of that character employing wings for propelling and controlling the flight thereof, the object of the present invention being to provide a flying machine which dispenses with the use of a balloon or gas field and which also embodies wings and operating and controlling means therefor of novel construction capable of propelling, sustaining and regulating the action of the machine, whereby the latter may be at all times under the complete control of the aeronaut.

With the above and other objects in view, the invention consists of the features of construction, combination and arrangement of parts hereinafter fully described and claimed, reference being had to the accompanying drawings, in which:—

Figure 1 is a perspective view of a flying machine embodying my invention. Fig. 2 is a diagrammatic view of the operating means for folding and unfolding the wings. Fig. 3 is a similar view of the operating means for varying the form of the main wings. Fig. 4 is a similar view of the operating means for varying the form of the steering or glider wings. Fig. 5 is a side view on an enlarged scale, showing the lever mechanism of the operating means illustrated in Figs. 2, 3 and 4. Fig. 6 is a transverse section through the upper frame bar showing in front elevation the devices illustrated in Figs. 2, 3 and 4. Figs. 7 and 8 are detail views of parts of the lever mechanism shown in Figs. 5 and 6. Fig. 9 is a plan view of one of the wings. Fig. 10 is a transverse section through the body of the wing on an enlarged scale. Fig. 11 is a longitudinal section through one of the individual feathers of the wing. Figs. 12 and 13 are transverse sections through the "quill" or stem thereof. Fig. 14 is a transverse section on an enlarged scale through the top bar of the frame and one pair of the main wings, portions only of the latter being shown. Fig. 15 is a section on line 15—15 of Fig. 14. Fig. 16 is a view of one of the wing twisting levers. Fig. 17 is a section through the shaft and one of the standards and its bearing for said shaft. Fig. 18 is a view similar to Fig. 14 of the frame construction and controlling means associated with the steering and glider wings. Fig. 19 is a view of one of the sets of lever devices thereof. Fig. 20 is a detail of one of the levers shown in Fig. 19.

The frame of the machine may vary to a considerable extent in construction, but as herein shown comprises an upper longitudinal bar or rod 1, constituting what may be called the back-bone of the machine, and from this bar or rod depends a series of standards or hangers 2 provided at their lower ends with bearings 3 for an oscillatory driving shaft 4. The shaft 4 is disposed a proper distance below the bar 1 and in parallel relation therewith and is preferably, as shown, of less length than said bar. The bar and shaft may be made of metal or of any other sufficiently durable, light and strong material. The front and rear standards 2 are provided with forked extensions 5 at their lower ends in which are journaled wheels or rollers 6 which are designed to support the machine upon the ground and to enable the same to run easily along the surface of the ground to permit the machine to have an easy descent, or to adapt it to acquire sufficient running force or momentum in starting to effect its ready ascent into the air. In order to insure an easy motion of the shaft 4, the bearings 3 are preferably of the antifriction type, each comprising bearing box sections 7 and 8, Fig. 17, the sections 7 being integral with the standard while the section 8 is removable for obvious purposes and is adapted to be secured in operative position to the standard by bolts or other suitable fastenings 9. The bearing box is of sufficiently larger diameter than the shaft to form an intervening annular raceway for a series of bearing balls 10, whereby the shaft is adapted to oscillate in the bearing with a minimum degree of friction. The frame structure, which properly includes the shaft, is strengthened and reinforced by diagonal struts or braces 11 connecting the standards or hangers and composed of cords, wires or other like suitable light, strong and durable strands.

Mounted for oscillating movement in a vertical plane upon the top bar 1 is a series of main propelling and sustaining wings arranged in pairs, the wings of each pair being disposed to project beyond opposite sides of the bar, while upon the forward end of the bar in advance of such propelling and sustaining wings is arranged a pair of steering and glider wings. The main wings at one side are denoted by the numerals 12, 12$^a$, 12$^b$, etc., while their companion wings at the opposite side are denoted by the numerals 13, 13$^a$, 13$^b$, etc., while the glider wings are denoted by the numerals 14 and 14$^a$. These wings are of a generally novel construction, and as the construction of each is the same a description of the construction of one will suffice for all. As shown particularly in Figs. 9 to 13, inclusive, each wing comprises a forward longitudinal body or frame 15 composed of sections 15$^a$ and 15$^b$ united at their meeting ends by one or more bridge plates or couplings 16 riveted or otherwise secured thereto. The body or frame is hollow and formed of a light resilient metal or some other suitable flexible material, and in general contour simulates the form of the body portion of the wing of a bird. Extending longitudinally through the said body or frame and formed thereon or secured thereto in any suitable manner is a sleeve 17, through which projects a tubular rod 18, the outer end of which is fixedly secured in any preferred manner within the extreme outer end of the tip section 15$^b$ of the body, as at 19, while the inner end of the rod projects inwardly beyond the butt end 15$^c$ of the main frame section 15$^a$, as at 20, and a portion of said rod adjacent said projecting inner end is exposed through a slot or opening 20$^a$ formed in said main frame section adjacent the butt. The portion of the rod extending through the main frame section 15$^a$ is loosely fitted in the sleeve 17 for free revoluble movement, while the outer end of the rod, as stated, is fixed in the tip section 15$^b$ so that it cannot turn independently therein, thus providing for a movement of the rod to change the general shape or contour of the wing, as hereinafter described. If desired, the entire portion of the rod inclosed within the section 15$^b$ may be fixed in any suitable manner thereto and the construction of the body portion of the wing in sections, as described, provides for the ready connection and disconnection of the parts in constructing and repairing the wing, as will be readily understood.

The rear portion of the body of the wing along its full extent is formed with a plurality of rows of receiving sockets or openings 21 arranged in longitudinal and vertical alinement, the vertical arrangement of the sockets being clearly indicated in Fig. 10, from which it will be seen that four rows of sockets are illustrated and are arranged at different distances from the center of the body of the wing. These sockets are adapted for the reception of the quill butts of a series of rows or layers of feathers 22, which overlap and are arranged in practice as nearly as possible to simulate the form and arrangement of the feathers in a natural wing. Each feather is preferably of the construction shown in detail in Figs. 11, 12 and 13, being formed of an artificial quill or stem 23 of light flexible metal or other suitable material and the required number of natural or artificial individual feather sections 24, the use of large natural turkey feathers or natural feathers of a similar type being preferred. The quill or stem 23 is formed of one or more portions of the material folded into tubular form and provided with a longitudinal partition or rib 25 separating the interior of the stem into opposite longitudinal receiving spaces or channels and serving also as a stay to strengthen the stem throughout its length. At diametrically opposite sides the outer walls of the stem are right angularly slitted to form series of entrance slots 26 through which the butt ends 27 of the stems of the individual feather sections are inserted to extend into the said channels or receiving spaces, the quill butts being inserted at a proper angle to dispose the feather sections obliquely in a natural way, so that the portions of the walls of the stem between the slits will operate as clamping jaws to hold said butts clamped against the rib or partition 25. The butts may also be cemented or otherwise secured in position, so that in connection with the action of said clamping portion they will be firmly and securely held against loosening or displacement. At the outer front portion of the body of the wing is an ear or projection 28, which may form an extension from the coupling plate 16.

It will be seen from the foregoing description that each wing is of a proper construction to have strength and durability with sufficient flexibility to enable it to be bent or twisted upon itself into different shapes or curvatures to operate as an aeroplane whose surfaces may be disposed at different working angles to act upon the air for ascension or descension, a steering motion to the right or left or for balancing the machine in the air so that it may remain stationary without descent or float or glide along with the air currents.

Each pair of main wings is supported by a carrier or rocking frame which is in the nature of a cross head mounted to oscillate upon the bar 1 in a vertical plane, said carrier comprising upper and lower cross bars 29 and 30 connected by an intermediate cross bar 31. The lower cross bar 30 is composed of two sections united by one or more fastening bolts 32. These sections are formed with semicircular portions 33 and 34 forming a bearing to pivotally mount the carrier upon the rod 1, which bearing may be, if desired, of the ball bearing type shown in Fig. 17. The bearing portion 33 integrally connects the parts 30 and 31, while the bearing portion 34, which is integral at its lower end with the adjacent section of the cross piece 30, is secured at its upper end to the straight portion of the part 31 by one or more securing bolts 34. The wings are directly mounted upon substantially triangular supporting frames 35, each comprising an upper bar 36 having spaced inner and outer bearings 37 and 38, a vertical inner bar 39, and a diagonal bracing arm 40 extending between the bearing 38 and the lower end of the arm 39, the lower meeting ends of said parts 39 and 40 being formed with overlapping ears perforated for the passage of bolts or rivets 41 which couple the same to each other and at the same time pivotally connect the lower portions of the supporting frames to the sections of the lower cross piece 30 of the carrier head. The bars 39 are provided at their upper ends with horizontal offsets 42 which connect said bars with the bearings 37 of the bars 36, and which offsets are pivotally connected with the ends of the upper cross piece 29 of the carrier head by bolts or rivets 43. This construction adapts the wing supporting frames or brackets to swing rearwardly to a position substantially parallel with the main frame, to fold the wings to an inoperative position, and also to swing forwardly from such position to a working position approximately at right angles to the main frame.

The rods 18 of the wings are journaled in the bearings 37 and 38 of the respective supporting frames or brackets 35 and the inner ends 20 of said rods project through openings 44 in the bars 39 and are apertured for the reception of transverse retaining pins or keys 45, which hold them from outward sliding movement and displacement, the wings extending to a major extent beyond the bearings 38, which occupy the openings 20ᵃ in the body portions thereof, the mode of assembling and disconnecting the parts being apparent from the described sectional construction of the body portions of the wings. It will thus be seen that the wings are adapted to have pivotal up and down motion on their rods 18 which are adapted to turn in the bearings 37 and 38, are adapted to be swung in a direction longitudinally of the frame to fold and unfold them, and are mounted to rock vertically through the carrier heads on the rod 1, so that in the operation of each pair of wings one wing will be descending while the other is ascending. An arm or lever 46 is fixed at its upper end to the inner end 20 of the rod 18 of each wing, while a lever 47 is secured to the butt or inner forward end of the body of the wing, said lever 47 having a forked upper end 48 embracing the adjacent rod 36 between the bearings 37 and 38 and terminating in perforated ears 49 secured to the wing body by suitable fastening devices. By swinging the lever 46 forwardly or rearwardly the tip portion of the wing through its connection with the outer end of the rod 18 may be turned or twisted out of its normal plane, while by a similar movement of the lever 47 the butt portion of the wing may be turned or twisted in like manner, and by moving these levers in reverse directions or holding one stationary while the other is operated the nature of the curvature or twist imparted to the wing may be varied, as will be readily understood, to change the shape of the wing and the degree of inclination of the different portions thereof as circumstances may require to adapt the machine to ascend, descend, to maintain a straight or gliding course or to regulate and proportion the resistances of the wings at the opposite sides of the machine to enable the latter to be steered or turned.

The foregoing description applies mainly to the construction of the main wings, the glider or steering wings 14 and 14ᵃ differing therefrom in construction in that the carrier head to which they are applied is rigidly mounted on the rod 1 by a sectional collar composed of parts 33ᵃ and 34ᵃ conforming in structure to the sectional bearings of the other wings but fastened to the rod by securing bolts or screws 34ᵇ, as shown in Fig. 18. The glider wings thus have no rocking motion, but are mounted to swing to folded and unfolded positions in the same manner as the main wing, and they are also adapted in a modified way to be turned or twisted in like manner to the main wings for steering and deflecting purposes. The lever mechanism whereby the said glider wings are turned or twisted comprises levers 46ᵃ and 47ᵃ which connect with the portions of the wings similar to the levers 46 and 47, but which, instead of being free from connection at their lower ends and adapted to be independently operated, are connected for movement in unison so that they may be swung in arcs of different degrees. As shown, the lever 47ᵃ has an inwardly curved lower end 50 which is movable in a curved transverse slotted guide 51 on the lever 46ᵃ, to which latter is secured a forked spring 52, between the arms of which the part 50 of the lever 47ᵃ extends. These arms engage the lever 47ᵃ in the opposite swinging movements of the lever 46ᵃ, and by their yielding action permit the lever 46ᵃ to swing to a determined extent before transferring motion to the lever 47ᵃ, the spring fork thus serving as a motion transmitting connection which permits the levers to have different degrees of swinging motion to provide for a variation in the degree of twist or deflection imparted to the butt and tip portions of the glider wings to vary their shape or curvature to the necessary degree to control the course of the ship. The glider wings are stayed and strengthened by flexible braces 53 suitably connected at their inner ends with a triangular bracket 54 formed upon or secured to the carrier head thereof and connected at their outer ends to the ears 28 of said wings.

The mechanisms for controlling the wings includes suitable operating levers and connections between the wings and levers. These levers are arranged at or near the center of the machine for actuation by the operator, who may also manually apply the power necessary to oscillate the shaft 4 for rocking the wings. As shown in the present instance, the means for oscillating the shaft 4 comprises an actuating cord or cable 55 which is wound one or more times around the shaft 4 and has its ends depending and provided with stirrups or loops 56 to receive the feet of the operator, who balances himself upon the same, and who by alternately working the ends of the cord up and down will oscillate the shaft to communicate motion to the wings. Each pair of wings is operated from the shaft by a flexible cord or connection 57 which is centrally wound around the shaft, as at 58, and is attached at its respective ends to the ears 28 of the opposite wings of such pair, so that when the shaft is oscillated the ends of the actuating cord will be alternately drawn upon to rock or swing the wings in an obvious manner. The actuating cords of the pairs of wings are alternately wound in opposite directions about the shaft 4, as clearly indicated in Fig. 1, so that the wings in regular order at each side will be alternately on an up and down motion, the first wing, for instance, moving upwardly while the next wing moves downwardly and so on throughout the series from front to rear, thus providing for an effective balancing of the machine in its flight, as well as for effective propulsion. The wing controlling levers are arranged in convenient position above the driving cord or cable 55. A lever 59 is pivotally mounted, as at 60, upon the standard immediately in front of the driving cord and is adapted to be swung upwardly to an inoperative position, as shown in Figs. 1 and 5, and to engage a suitable keeper 61 whereby it is retained in such position, in which it holds the wings outspread or unfolded for use. To the lever is connected one of the stretches of a looped operating cord or cable 62 which passes around guide pulleys 63 on the front and rear of the bar 1 and thus extends longitudinally along the bar. To the other stretch of this cable are attached opposite series of triangular draft cords 64 which are attached at their vertices or points 65 to the wings, thus connecting all of the wings at each side to the operating cord 62, so that by swinging the lever 59 in one direction or the other the wings may be moved outward to a working position or folded inwardly to a non-working position, the latter position being employed in effecting a rapid descent and to enconomize space in storage, etc. It will be understood, of course, that the draft cords may have a suitably guided connection with the bar 1, and may vary in arrangement at the option of the operator or manufacturer. Bracket plates 66 are arranged on opposite sides of the bar 1 in proximity to the lever 59 and are provided with trunnions 67 to swing laterally in bearings 68 on said bar. Supported by these bracket plates are levers 69, each comprising a relative stationary section 70 pivotally mounted at its upper end upon a pin or stud carried by its supporting bracket plate 66, and a relatively movable section 72 slidably connected at its lower end with the section 70 by a guide loop 73 and provided at its upper end with a longitudinal slot 74 receiving the said pin or stud 71, the lower end of said section 72 being formed or provided with a controlling handle 75. The levers 69 are provided to respectively operate a set of controlling cords connected with the levers 46 and 47 of the wings at the opposite sides of the machine. As shown particularly in Figs. 3 and 4, each set comprises a pair of looped cords 75 and 76, which cords pass at their ends around sets of guide pulleys 75$^a$ and 76$^a$, respectively, at the front and rear of the bar 1. One of the stretches of the cord 75 is attached to ears 77 on the sliding lever section 72, while the other stretch of said cord has connected therewith a series of draft cords 78 which pass through suitable guides 79 on the bars 31 of the wing carrier heads and are connected with the levers 47, while in a similar manner one of the stretches of the cord 76 is connected with ears 80 on the lever section 70 and has its other stretch connected with a series of draft cords 81 passing through similar guides 82 on the said carrier head bars and attached to the levers 46, the arrangement of the draft cords 78 and 81 being such as to properly connect the sets of levers 46 and 47 according to their order of arrangement. As the controlling connections for the purpose described for both sets of wings at each side of the machine are the same in construction and arrangement, it will be understood that the operator by means of the levers 69 and the controlling cords may twist or turn the wings at each side to the same degree or to different degrees to vary their resistance and to dispose them properly to take an ascending or descending course and to assist in steering the machine in opposite directions, as well as to control the same in making turns. By sliding the lever sections 72 upwardly to any desired extent limited by the slots 74 therein, it will be understood that the fulcrum points of such lever sections may be varied and the throw thereof regulated to increase or diminish the extent of movement of the controlling cord 75, whereby the degree of movement of the levers 47 may be regulated to impart a greater or less degree of twist or curvature to the heel of the wings, by which the curvature or change in form of the wings within the maximum limits is in the greater measure controlled, thus providing for a wide variation in the shape or contour of each wing to secure the best results in operation for the more complete and thorough control of the machine.

Means are provided by which the glider or steering wings may be regulated as to twist or curvature independently of or simultaneously with the main wings, and whereby the glider wings themselves may be independently or simultaneously varied as to form to the same or different degrees. To this end a pair of T-shaped levers 83 is pivotally mounted on a supporting bracket 84, one above the other, on the bar 1, and to the oppositely extending arms of the main portion of each of said levers is connected the ends of a looped controlling cord 84ª, which passes at its forward end around a guide pulley 85 on the forward end of the bar 1, the several guide pulleys 63, 75ª, 76ª and 85 being disposed in superposed relation at the ends of the bar and preferably mounted upon common pivot posts. The other arm of each lever 83 extends rearwardly, and such arms of the two levers 83 are connected to the inner ends of links 86, which are coupled at their outer ends to the bracket plates 66, the lower edges of which latter are engaged by clips 87 on the stationary sections 70 of the respective levers 69, so that said levers 69 may swing longitudinally of the machine independently of the bracket plates, but when swung laterally inward or outward will be coupled to the bracket plates by said clips, and will thus carry with them the bracket plates, on the fulcrums of which they swing, whereby the links 86 will be moved in or out to impart swinging motion in one direction or the other to the levers 83 to move the operating stretches of the cords forwardly or rearwardly. The operating stretches of the cords are connected with the respective controlling levers 46ª of the glider wings, by which, through a lateral adjustment of the levers 69, the form or curvature of said wings may be varied. It will thus be seen that by proper manipulation of the levers 69 the several sets of wings may be controlled to an effective degree to secure a nicety of action of the same on the atmosphere to provide for the thorough and complete regulation of the machine in its movements in any direction.

From the foregoing description, it is thought that the construction and mode of operation of my improved flying machine will be readily understood without a further extended description, and that its advantages will be understood and appreciated by those versed in this particular art.

While the principles of construction as herein shown are in general preferred, it will, of course, be understood that modifications within the spirit and scope of the invention as defined by the appended claims may be made as circumstances and conditions may require. A suitable type of motor may also be employed for actuating the driving shaft 4.

Having thus fully described the invention what is claimed as new is:

1. A flying machine comprising a frame, including an oscillatory shaft, wings pivotally mounted in pairs upon the frame, the wings of each pair projecting beyond opposite sides of the frame, operating cords wound about the shaft and having their end portions connected with the wings of each pair, means for oscillating the shaft, and means for varying the conformation of the wings.

2. A flying machine comprising a frame, including an oscillatory shaft, transversely arranged carrier heads mounted to swing in a vertical plane upon the frame, a pair of wings supported by each carrier head and extending beyond opposite sides of the frame, means for oscillating the shaft, connections between the shaft and sets of wings for operating the latter, and means under the control of the operator for varying the conformation of the wings.

3. A flying machine comprising a frame, including an oscillatory shaft, transversely arranged carrier heads mounted to swing in a vertical plane upon the frame, a pair of wings supported by each carrier head and arranged on opposite sides of the frame, said wings being pivotally mounted upon the head to swing longitudinally of the frame to folded and unfolded positions, operating means for swinging said wings to fold and unfold the same, means for oscillating the shaft, and connections between the shaft and wings for swinging or oscillating said wings on their carrier heads.

4. A flying machine comprising a frame, transversely arranged pairs of wings pivotally mounted to swing in a vertical plane upon the frame, an oscillatory shaft mounted on the frame, means for oscillating the same, means operated by the shaft for swinging the wings, said means being operated to alternately swing the several pairs of wings of the series in reverse directions, and means under the control of the operator for varying the curvature or conformation of the wings.

5. A flying machine comprising a frame, transversely arranged pairs of wings pivotally mounted upon the frame to swing in a horizontal plane and also pivotally mounted to swing in a vertical plane, an oscillatory shaft, means for operating the same, means actuated by the shaft for swinging the wings in a vertical plane for propelling and like purposes, means under the control of the operator for swinging the wings horizontally from an operative to an inoperative position and vice versa, and means under the control of the operator for varying the curvature or conformation of the wings.

6. A flying machine comprising a frame, transverse carriers pivotally mounted upon the frame to swing in a vertical plane, a pair of propelling wings supported upon each carrier, said wings being disposed at opposite sides of the frame, an oscillatory shaft, connections between the shaft and wings for alternately and simultaneously swinging the several pairs of wings in opposite directions, and means under the control of the operator for independently varying the curvature or conformation of the wings at the opposite sides of the frame.

7. A flying machine comprising a frame, oppositely extending wings arranged in pairs and pivotally mounted upon the frame, means for operating the wings, and means under the control of the operator for reversely bending or twisting the wings, tip and butt to vary their curvature or conformation.

8. A flying machine comprising a frame, wings pivotally mounted in pairs upon the frame and extending beyond the opposite sides thereof, means for swinging the wings on their pivotal connections, and devices under the control of the operator for independently and reversely bending or twisting each wing at tip and butt to vary the curvature or conformation of said wings.

9. A flying machine comprising a frame, wings pivotally mounted in pairs upon the frame to swing in a vertical plane and extending beyond the opposite sides of the frame, said wings being also pivoted to swing in a horizontal plane from a folded to an unfolded position and vice versa, operating means for swinging the wings in a horizontal plane, operating means for swinging the wings in a vertical plane, said means being operative to alternately swing the several pairs of wings in reverse directions, and devices under the control of the operator for independently bending or twisting the wings at each side to vary the curvature or conformation of said wings.

10. A flying machine comprising a frame, carrier heads pivotally mounted to swing laterally upon the frame, a pair of horizontally swinging wing carrying frames pivotally mounted upon the opposite sides of each head, wings supported by the carrying frames on each head, means for oscillating the carrier heads to swing the wings of each pair in a vertical plane, means for horizontally swinging the wings upon their supporting frames to move said wings from an inoperative or folded to an operative or unfolded position and vice versa, and means connected with the wings and under the control of the operator for independently varying the curvature or conformation of the wings at each side of the frame.

11. A flying machine comprising a frame, carrier heads pivotally mounted to swing laterally upon the frame, a pair of horizontally swinging wing carrying frames pivotally mounted upon the opposite sides of each head, wings supported by the carrying frames on each head, twisting levers connected with the butt and tip portions of each wing, means for swinging the wings horizontally from a folded to an unfolded position and vice versa, and controlling devices independently connected with the twisting levers of the sets of wings at each side of the frame, whereby the curvature or conformation of the different sets of wings may be varied to different degrees.

12. A flying machine comprising a frame, transversely arranged pairs of main wings pivotally mounted upon and extending beyond opposite sides of the frame, rigidly mounted steering or glider wings at the forward end of the frame, means for operating the main wings, and means for independently or simultaneously changing the conformation or curvature of the main wings and the glider wings.

13. A flying machine comprising a frame, transversely arranged pairs of main wings pivotally mounted upon and extending beyond opposite sides of the frame, rigidly mounted steering or glider wings upon the forward end of the frame, and sets of devices for independently varying the conformation or curvature of the main and glider wings at the opposite sides of the frame.

14. A flying machine comprising a frame, main propelling wings oppositely mounted upon and projecting beyond the opposite sides of the frame, steering or glider wings upon the forward end of the frame, means for operating the main wings, connections between the main and glider wings at each side of the frame whereby the conformation of said wings may be varied, and devices for independently operating said connections.

15. A flying machine comprising a frame, main propelling wings mounted upon and projecting beyond the opposite sides of the frame, steering or glider wings similarly mounted upon the forward portion of the frame, connections between the main wings at each side of the frame for bending or twisting said wings in unison to vary their conformation, devices for independently bending or twisting the glider wings to vary their conformation, means for independently or simultaneously operating said connections, and means connecting said operating means with said devices whereby the several sets of wings may be independently or simultaneously controlled to vary their curvature or conformation.

16. A flying machine comprising a frame, operating wings mounted upon the frame, means for swinging the wings from an operative to an inoperative position and vice versa, and means including twisting devices connected with the respective wings for varying the curvature or conformation of said wings.

17. A flying machine comprising a frame, propelling and steering wings mounted on the frame, means for operating the propelling wings independently of the steering wings, and means for varying the curvature or conformation of the wings.

18. A flying machine comprising a frame, flexible propelling wings upon the frame, means for operating the wings, twisting devices connected with the butt and tip portions of each wing, and means for independently or simultaneously operating said devices to vary the shape or conformation of the wings.

19. A flying machine embodying propelling wings, each comprising a flexible body portion having receiving sockets and feathers provided with stems having their butts fitted in said sockets, each feather having its stem portion provided with a partitioned channel and opposite side slits leading thereto, and individual feather sections having the butt portions of their stems inserted through said slits into the sections of the channel and confined therein.

20. A flying machine embodying propelling wings, each comprising a flexible body portion, a twisting device extending through said body portion and connected with the tip of the wing, means for operating said twisting device, and independent twisting means connected with the butt portion of the wing.

21. A flying machine comprising a frame, transversely arranged pairs of main wings pivotally mounted upon and extending beyond opposite sides of the frame, steering or glider wings upon the frame, and sets of devices for independently varying the conformation or curvature of the main and glider wings at the opposite sides of the frame.

22. An aerial vessel provided with a pair of sustaining surfaces each in the form of a wing, a bearing in which the inner or adjacent ends of the wings are mounted to turn independently of each other, the said bearing being supported above the vessel and mounted to be rocked in a direction transverse of the vessel, to swing said wings up and down.

23. An aerial vessel provided with a pair of sustaining surfaces each in the form of a wing, a bearing in which the inner or adjacent ends of the wings are mounted to turn independently of each other, the said bearing being supported above the center of the vessel and mounted to be rocked in a direction transverse of the vessel to move both of said wings up and down, and means for moving the bearing and for turning each wing in its bearing.

24. An aerial vessel provided with a framework, sustaining surfaces mounted on said framework, supporting means in which each sustaining surface is mounted to turn independently of the other to change the angle of incidence of the sustaining surfaces, and arms extending downward from the sustaining surfaces and adapted to be moved forward or backward to turn the sustaining surfaces in the supporting means, the said supporting means being mounted to be turned transversely of the vessel, to swing the said sustaining surfaces up and down.

25. An aerial vessel provided with a pair of sustaining surfaces, a bearing in which the adjacent ends of the sustaining surfaces are mounted, the said bearing being mounted to rock approximately above the center of the vessel, the axis of said bearing extending in a direction longitudinally of the vessel, the said sustaining surfaces being mounted to turn on said bearing independently of each other and in a direction at right angles to the direction of movement of the bearing.

In testimony whereof I affix my signature in presence of two witnesses.

CHARLES N. NEWCOMB.

Witnesses:
  GEORGE W. HANN,
  J. GRIFFIN.